UNITED STATES PATENT OFFICE.

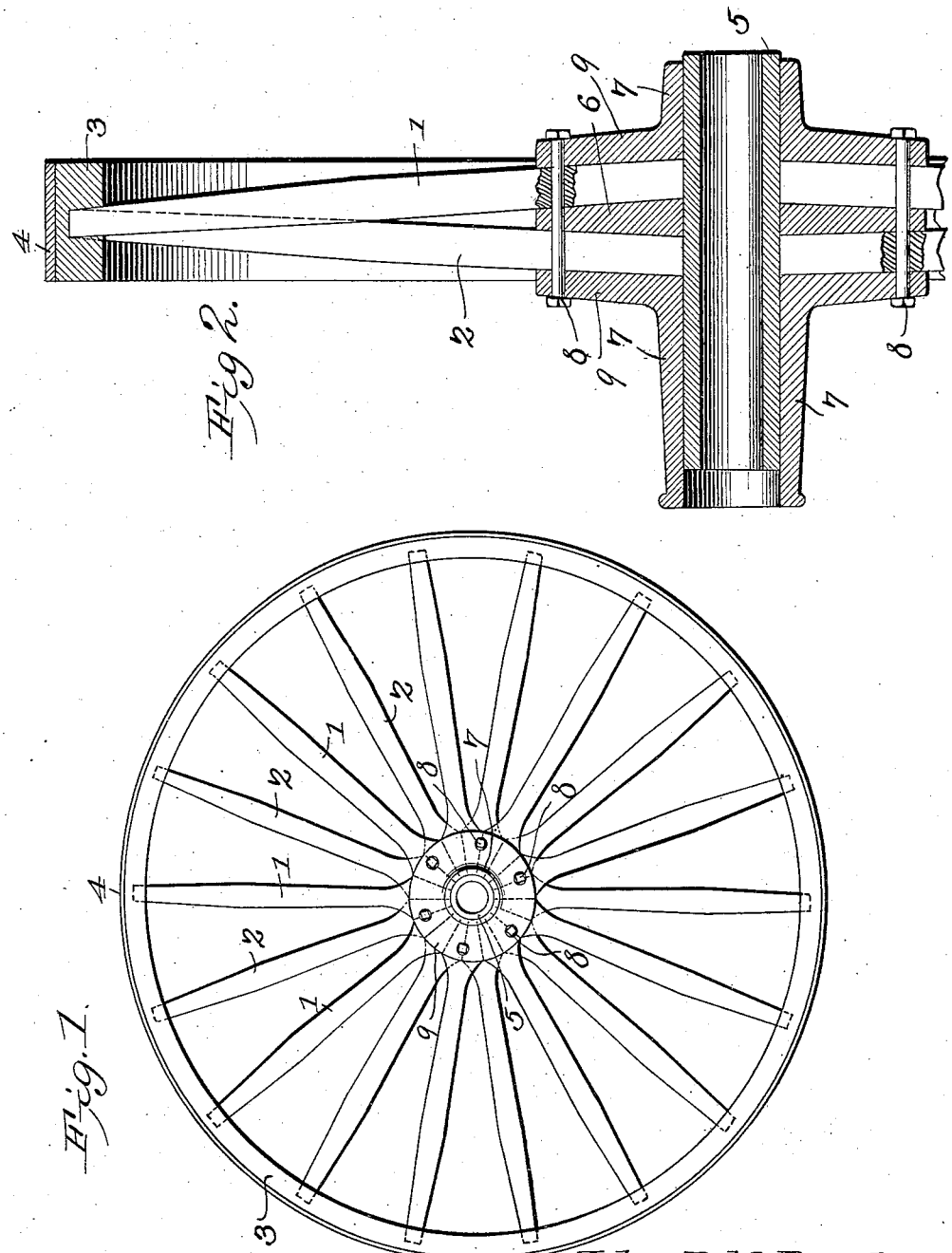

JOHN BLACKSTONE McDONALD, OF JACKSONVILLE, FLORIDA, ASSIGNOR OF ONE-HALF TO HUGH PARTRIDGE, OF DUVAL COUNTY, FLORIDA.

VEHICLE-WHEEL.

No. 884,840.

Specification of Letters Patent.

Patented April 14, 1908.

Application filed June 9, 1906. Serial No. 321,058.

*To all whom it may concern:*

Be it known that I, JOHN BLACKSTONE McDONALD, a citizen of the United States, residing at Jacksonville, in the county of Duval and State of Florida, have invented a new and useful Vehicle-Wheel, of which the following is a specification.

This invention relates to a vehicle wheel of that type having two sets of oppositely dished spokes connecting the hub and rim, and it relates more particularly to a hub construction for wheels of this character.

The objects of the invention are to improve the construction and arrangement of parts, so as to produce a hub which is simple and cheap to construct, which is durable and substantial, and which is capable of long and continued use without the double or opposing tension of the two sets of spokes becoming impaired.

With these objects in view, and others as will appear as the nature of the invention is better understood, the invention comprises novel features of construction and combination of parts, described hereinafter in connection with the accompanying drawings, and set forth with particularity in the claims appended hereto.

In the accompanying drawing, which illustrates one of the embodiments of the invention, Figure 1 is a side elevation of a wheel with the improved hub. Fig. 2 is a section taken diametrically of the wheel.

Corresponding parts in the several figures are indicated throughout by similar characters of reference.

Referring to the drawing, 1 represents the spokes of one set and 2 the spokes of the other set, the sets being oppositely dished from the hub and arranged with their outer ends preferably in a common plane to fit in equally spaced mortises in the felly 3. The tire for the rim may be of any desired character, such as solid rubber, cushion, or pneumatic, or, as shown, it may be of the metal band type, indicated at 4.

The hub comprises an axle box 5 around which the separating washer 6 and flanged collars 7 extend. These members 6 and 7 may be driven or otherwise suitably secured directly on the axle box, or a wood filling may be interposed between them and the axle box, as will be readily understood. The member 6 preferably takes the form of a washer, although, if desired, it may be a flange cast integral with the axle box. As shown in Fig. 2, the foot ends of the spokes are wedge-shaped so that, when the spokes of each set are assembled, adjacent spokes are in contact. The feet of one set of spokes are held between the washer 6 and one of the flanged collars 7, while the feet of the other set of spokes are disposed on the opposite side of the washer and between the latter and the other flanged collar. The dimensions of the collars and washer may be varied for different sizes of wheels, as desired, and the width or axial dimension of the washer may be varied according to the amount of dish desired between the two sets of spokes. The feet of the spokes are rigidly held in place between the collars and separating washer by means of the several through bolts 8. The spokes of one set are staggered with respect to the spokes of the other set, so that the bolts are arranged to pass centrally through the foot of a spoke of one set and between the two nearest or adjacent spokes on the other set, so that one bolt serves to lock or engage three spokes. The spokes through which the bolts pass are perforated, while the spokes between which the bolts pass are recessed to engage with the bolts. As shown in Fig. 1, the bolts pass alternately through one spoke and between the next two spokes of either set. By this construction, the spokes can be rigidly held in place so as to withstand the side thrusts exerted on the wheels incident to use, without the spokes becoming loosened or worn, the washer 6 and the flanges 9 of the collar 7 serving to brace the spokes against side thrusts in both directions. In other words, the feet of the spokes are entirely incased in a metal housing, and, as the spokes are wedge-shaped and contact one with another, they form a strong and substantial hub construction capable of successfully standing direct pressure in a radial direction and lateral or axial pressure exerted, as when turning around corners with a high speed. The spokes are first attached to the hub in such a way that the outer ends of each set will lie in two separate planes a considerable distance apart, so that in order to fit on the rim, the spokes of one set are flexed toward the center plane of the wheel, while those of the other set are correspondingly flexed toward the said plane. In other words, after the rim is fitted to the spokes, the latter, by reason of the opposing dish of the sets, are under a double tension. After the rim is fitted on the spokes, the band tire is shrunk in place, thereby producing a wheel which is rigid and unyielding to strains exerted thereon in any direction. This construction, while simple, light in weight, and symmetrical in design, has been found to be a number of times stronger than the ordinary dished wheel.

The wheel herein described has been designed primarily for use in self propelled trucks, carriages, and the like, but I desire to have it understood that the same may be employed with equal advantage in horse drawn vehicles.

I have described the principle of operation of the invention, together with the apparatus which I now consider to be the best embodiment thereof, but I desire to have it understood that the apparatus shown is merely illustrative and that various changes may be made, when desired, as are within the scope of the invention.

What is claimed is:—

1. A wheel comprising two sets of spokes arranged in staggered relation, the inner ends of the spokes in each set being in contact, hub parts between which said spokes are held, and fastening bolts extending through said hub parts and through or engaging said spokes, said bolts being so disposed that each alternate bolt passes through the center of a spoke in one set and between wo contacting spokes in the other set, and each of the other bolts passes between two contacting spokes in the first mentioned set and through a spoke in the other set.

2. A wheel comprising two sets of spokes arranged in staggered relation the spokes of each set having their inner ends in contact, a metal washer disposed between the two sets of spokes at their inner ends and having smooth surfaces against which the spokes rest and a central opening, clamping collars having smooth inner faces arranged to bear on the outer sides of the sets of spokes for holding them in contact with said washer, an axle box extending through the collars and washer and fitting tightly therein, and bolts extending through said collars and washer near their peripheries, said bolts being so disposed that each alternate bolt passes through the center of a spoke in one set and between two contacting spokes in the other set, and each of the other bolts passes between two contacting spokes in the first mentioned set and through a spoke in the other set.

In testimony that I claim the foregoing as my own, I have hereto affixed my signature in the presence of two witnesses.

JOHN BLACKSTONE McDONALD.

Witnesses:
H. G. STONE,
H. E. JAMES.